Nov. 17, 1931.   T. BROWN   1,831,997
PLOW
Filed Oct. 16, 1929   4 Sheets-Sheet 3

INVENTOR
Theophilus Brown
BY Brown, Jackson, Boettcher & Diemer
ATTORNEYS

WITNESS
Walter Ackerman

Nov. 17, 1931.   T. BROWN   1,831,997
PLOW
Filed Oct. 16, 1929   4 Sheets-Sheet 4

INVENTOR
Theophilus Brown
BY Brown, Jackson, Boettcher & Diemer
ATTORNEYS

WITNESS
Walter Ackerman

Patented Nov. 17, 1931

1,831,997

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

PLOW

Application filed October 16, 1929. Serial No. 399,913.

This invention relates to tractor plows generally and is particularly concerned with tractor plows where the plow bodies are coupled close to the tractor and are adjustably supported thereby.

It is usual in plows of this type to have one traction wheel of the tractor run in the furrow made in the preceding round and to have the other traction wheel run on the land. This causes a lateral tipping of the tractor. It is necessary, nevertheless, to have the plow bodies level in order that the furrows may be uniform. It is obvious that the deeper in the ground the plows operate the more the tractor will be tipped laterally.

Hence it is necessary that some form of lateral or transverse adjusting means be provided in the connections between the plows and the tractor. In my prior patent, 1,722,786, dated July 30, 1929, the forward ends of the plow beams are operatively connected by a transverse bail which is, in turn, supported by brackets on the frame of the tractor. The plow bodies are leveled by adjusting their position with respect to the bail.

The principal object of my invention is to provide an improved form of leveling means for close coupled plows and one wherein the plow bodies are held in fixed relation with respect to the carrying portion of the bail at all times, so that the connection of the plows with the tractor is, practically speaking, a rigid one at all times.

Other objects and advantages of my invention will be apparent to those skilled in the art after a consideration of the following detailed description taken in conjunction with the accompanying drawings, in which.

Figure 1:
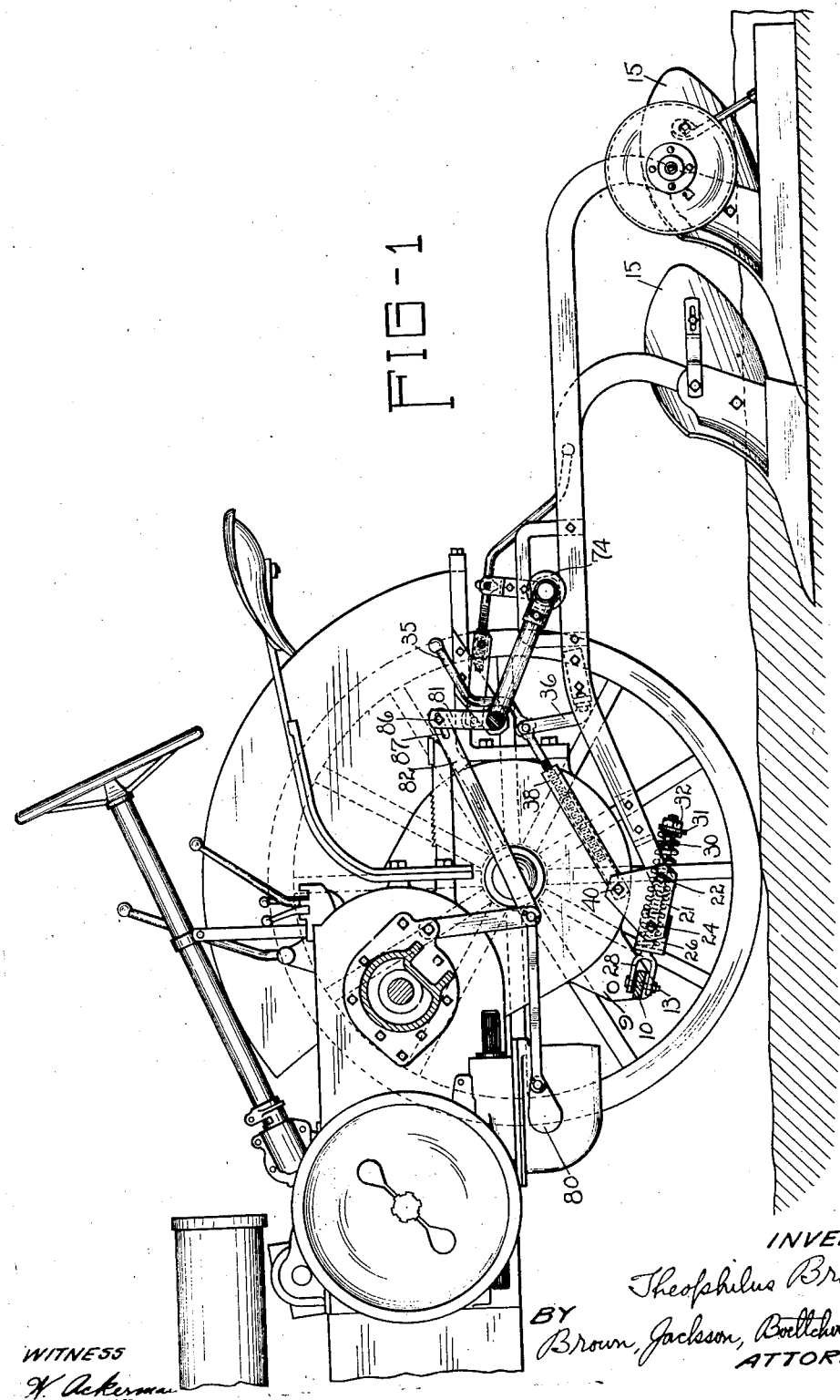
Figure 1 is a cross sectional view taken on the line 1—1 of Figure 2 and showing certain parts in sections and other parts in elevation.

In the drawings the reference numeral 1 indicates, as a whole the tractor which is provided with a motor, the fly wheel of which is denoted by the reference numeral 2, and the usual frame the rear portion of which is extended, as at 5, to form supports for the fenders 6. The drive or traction wheels of the tractor are indicated by the reference numeral 7. The usual gear means for driving the traction wheels 7 is enclosed in housings 8, each of which is provided with a depending bracket 9, as shown in Figure 1. A transverse draw bar 10 is carried by these brackets, and the draw bar 10 is provided with a slot 11 in which is received the bolt 13 forming a part of a spring cushioned hitch device, later to be described.

In the embodiment which I have chosen to illustrate my invention I provide a plow structure including two plows 15 carried by the usual beams 16 securely fastened together by braces 18 to form a rigid unit. At their forward ends the beams 16 converge and are connected together by a U-shaped brace 19. The extreme forward ends of the beams 16 are pivotally connected, respectively, to two triangular plates by any known means, such as bolts 22. The forward portions of the triangular plates 21 are pivoted, as by bolts 24, to a U-shaped bracket 26 which forms a part of the spring cushioned hitch. The last mentioned hitch construction comprises the link 28 which is pivoted at the front end to the tractor draw bar 10 by means of the bolt 13 and which extends rearwardly through a perforation in the U-shaped bracket 26. The link 28 extends rearwardly a sufficient amount to be embraced by a cushioning spring 30 having one end received against the rear face of the bracket 26 and the other end against the washer 31 held on the rear end of link 28 by means of a nut 32. Thus the tractive force of the tractor is transmitted to the plow in a resilient and yielding manner where there is little likelihood of sudden jolts and jars damaging either the tractor mechanism or the plow.

The height of hitch, or the longitudinal leveling of the plow is controlled by leveling means of the same general type as that disclosed in the allowed application of myself and Carl G. Strandlund, Serial No. 689,029 filed January 28, 1924, and is seen to consist of a crank screw 35 which is supported at its rear end by a pair of brackets 36 bolted to the front brace 18. The crank screw 35 screws into an internally threaded member 38, the front end of which is flattened and is pivotally connected to the upper corner of the triangular plates 21 by means of a bolt 40. The member 38 is held in the middle of the bolt and between the two plates 21 by means of sleeves 42 which embrace the bolt 40 on either side of the member 38. It will thus be seen that rotation of the crank screw 35 will occasion a rocking movement of the plates 21 about the axis defined by the bolt at 24 which will serve to raise the point of pivotal connection 22 of the plow beams 16 with the plates 21.

Figure 2:
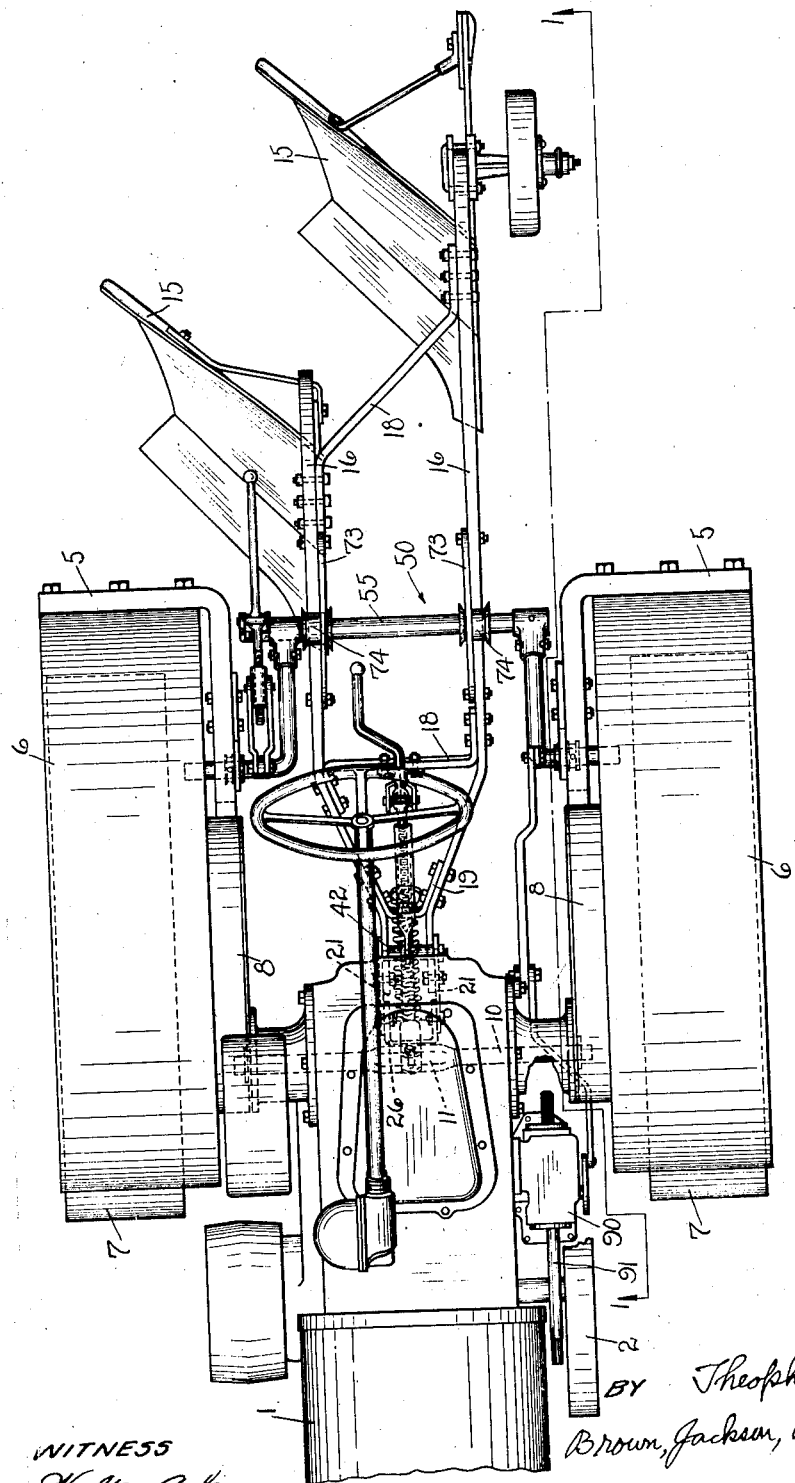
Figure 2 is a plan view of the rear portion of the tractor with the plows mounted thereon.

The plows are moved to and from transport position by means of a bail member, indicated in its entirety by the reference numeral 50. Each of the frame members 5 is provided with a depending bracket 51, and these brackets 51 are adapted to receive the arms 52 and 53 which form a part of the bail member 50. The bail member 50 also includes a center member 55 which, as is clear from Figures 2 and 3, serves to directly support the plow means 16. One end of the center member 55 is carried upon the arm 52 by means of a fitting 56 and the other end of the center member 55 is carried upon the other arm 53 by means of a fitting 57.

Figure 5:
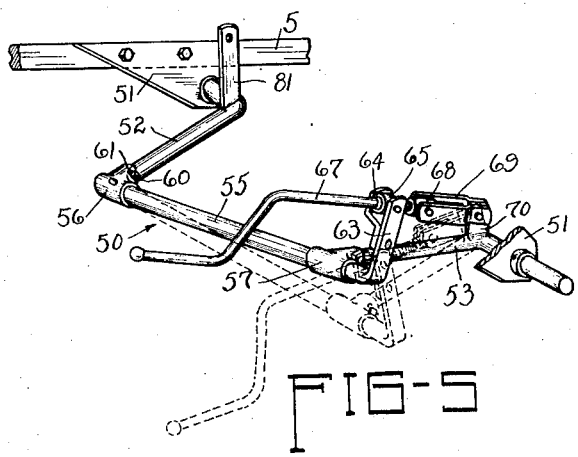
Figure 5 is perspective view of the plow carrying bail with the right hand adjusting side of the carrying portion thereof shown in a raised position in the full lines and in a lowered position in dotted lines.
Figure 4:
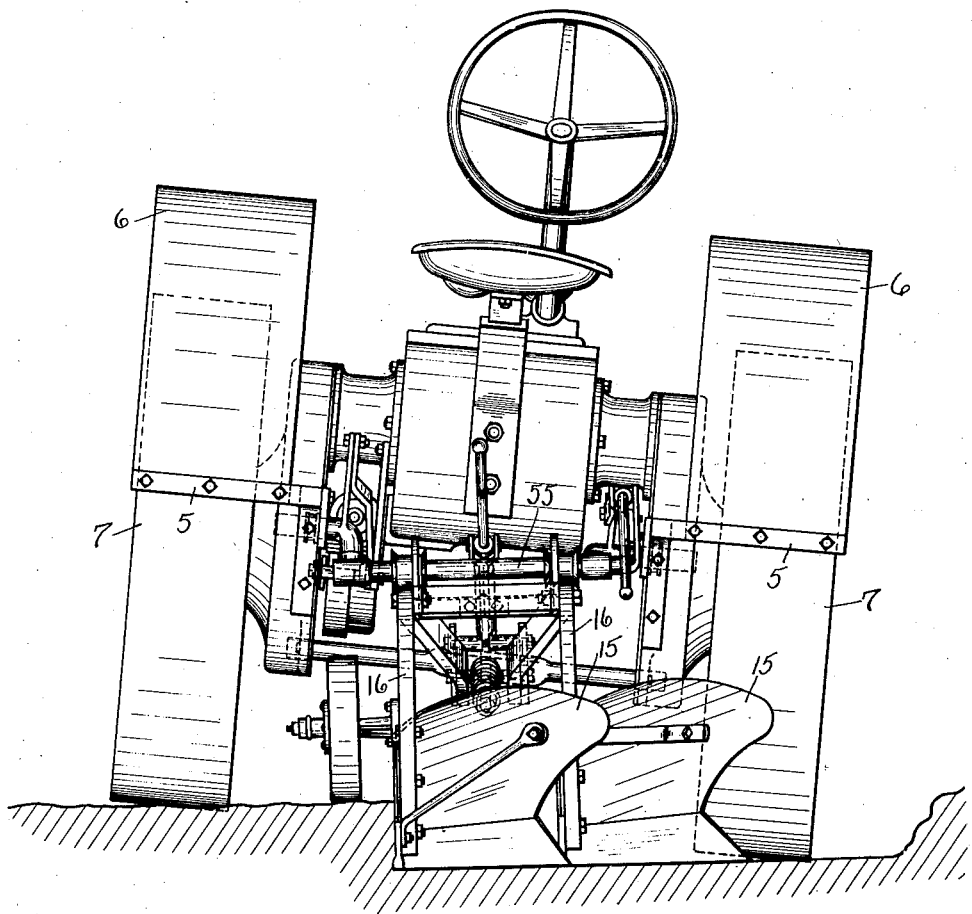
Figure 4 is rear view of the tractor and plows as shown in Figure 1, namely, in normal working position.

The fitting 56 connects with the end of the arm 52 by means of a bolt 60 passing through slots 61 formed in the fitting 56. The bolt 60 is rigidly received by the arm 52 but, by virtue of the slots 61 formed in the fitting 56, the latter has limited rotation on the arm 52. The fitting 56 is rigidly pinned to one end of the center member 55. The other end of the center member 55 is journaled in the fitting 57 which fitting is connected to and has limited rotative movement with respect to the arm 53 in the same manner as fitting 56 is connected to the arm 52. The right hand end of the center member 55 has an upturned arm 63 formed integral therewith. Between the upper end of the arm 63 and a bracket 64 fixed thereto, a collar 65 is pivotally mounted and which supports a crank screw 67. This crank screw is threaded into a nut 68 which is pivotally supported between brackets 69 which are, in turn, pivotally supported on a small lug 70 formed on the upper side of the arm 53, as clearly shown in Figure 5. Preferably the threads of the crank screw 67 are so arranged that by turning the crank screw 67 in a clockwise direction as viewed in Figure 4, the right hand side of the bail member 50 may be caused to rise to the position shown in the full lines in Figure 5, and turning the crank screw 67 in the opposite direction will cause the right side of the bail member to move to the position shown in dotted lines in Figure 5. In effect, therefore, the crank screw 67 and associated structure form a means for distorting the bail member 50.

As has been stated, the plow beams 16 are supported by the center member 55 of the bail 50, and for this method I provide each plow beam with a bracket 73 adapted to be bolted to the beam and which is adapted to embrace a roller 74 carried by the center member 51. The provision of the rollers 74 thus enables the plow beams to be raised and lowered with the minimum amount of effort while the provision of the brackets 73 maintains the plow beams in fixed relation to the bail member 50, and particularly the center member 55, at all times.

By virtue, therefore, of the fixed relation of the plow beams to the center member 55, just described, the plows can be leveled by giving to the bail member 50 a proper amount of distortion, which is secured as stated above by rotating the crank screw 67 in one direction or the other. As is clear from Figure 4, the amount of distortion required will vary with the depth of plowing. Raising or lowering one end of the center member 55 will thus accommodate the plows to the various angles of tilt experienced by the tractor in running with one wheel in the furrow and one wheel on the land.

Figure 3:
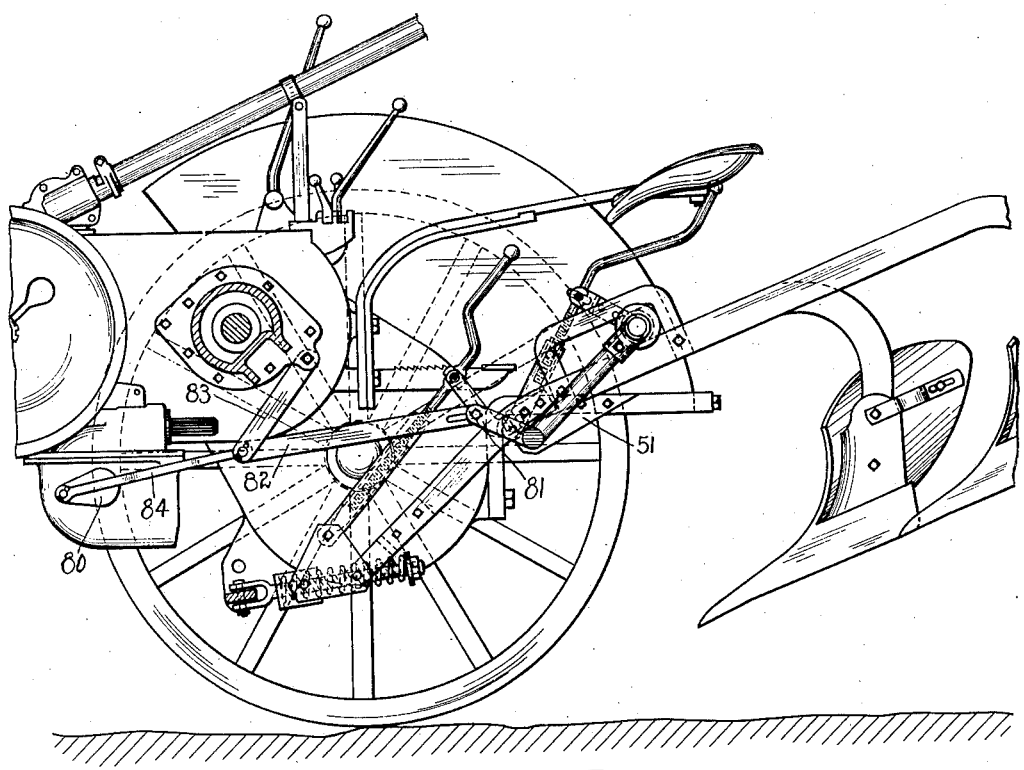
Figure 3 is view similar to Figure 1 and shows the plows in transport position.

The plows are lifted to transport position, the position shown in Figure 3, by means of a connection between the bail member 50 and the power lift crank 80 on the tractor. For this purpose the arm 52 of the bail member 50 is provided with a short arm 81 having a slotted connection with a link 82, the forward end of which is supported by a pendulum link 83 depending from a portion of the actual housing of the tractor. A third link 84 serves to connect the link 82 with the power lift crank 80. The slotted connection between the links 81 and 82 is necessary in order to allow for the relative movement between the plow beams 16 and the frame of the tractor when the beams are adjusted for depth of plowing. The slotted connection just mentioned includes a bolt 86 carried by the link 81 and received by the slot 87 in the link 82. The power lift crank 80 is preferably actuated by a half revolution clutch mechanism enclosed within a housing 90 and which is actuated by means of a power take-off shaft 91 operatively connected to the motor of the tractor in any desired manner.

While I have described in connection with the accompanying drawings the specific form in which I prefer to embody my invention, it is to be understood that the invention is not to be limited to the specific means which I have herein shown and described, and that in fact widely different means may be employed in the practice of the broader aspects of my invention.

Having thus described my invention what I claim and desire to secure by Letters Patent is:

1. A tractor plow comprising the combination of a tractor having a frame and a draft member, a plurality of plow beams having plows thereon and connected with the draft member to swing vertically, a U-shaped bail having its ends movably mounted on the tractor and operatively connected with the plow beams for lifting the plows, and means for tilting the bail and plow beams to level the plows.

2. A tractor plow comprising the combination of a tractor having a frame and a draft member, a plurality of plow beams having plows thereon and connected with the draft member to swing vertically, a bail mounted on the tractor and operatively connected with the plow beams for lifting the plows, said bail comprising a distortable member having ends journaled on the frame, and means for distorting said bail member whereby to level said plows.

3. A tractor plow comprising the combination of a tractor having a frame and a draft member, at least one plow beam having a plow thereon and connected with the draft member, a bail mounted on the tractor frame, the plow beam being fixed to the intermediate portion of the bail, and means for raising or lowering one side of the bail with respect to the other whereby the plow beam is leveled.

4. A tractor plow, comprising the combination of a tractor having a frame and a draft member, a plurality of plow beams having plows and connected with said draft member to swing vertically, a bail mounted on the tractor and comprising angularly related members relatively movable about axes extending in different directions for lifting the plows, and means carried by the bail and operative to adjust said angularly related members to level the plows.

5. A tractor comprising the combination of a tractor having a frame and a draft member, a plurality of plow beams provided with plows and connected to the draft member, a bail mounted on the tractor and directly connected with the plow beams for lifting the plows, said bail including relatively movable parts, and means to adjust the said parts whereby the plows are leveled.

6. A tractor comprising the combination of a tractor having a frame and a draft member, a plurality of plow beams provided with plows and connected to the draft member, a bail mounted on the tractor and comprising a pair of arms respectively pivoted to opposite sides of the frame and movably carrying a central member, said beams being secured to said central member, said central member having a rigid upstanding portion and means secured to one of said arms and cooperating with said upstanding portion to raise or lower one end of the central member relative to the other end whereby the plows are leveled.

7. A tractor comprising the combination of a tractor having a frame and a draft member, a plurality of plow beams provided with plows and connected to the draft member, a bail mounted on the tractor and comprising a pair of arms respectively pivoted to opposite sides of the frame and movably carrying a central member, said beams being secured to said central member, said central member having a rigid upstanding portion and manually operated screw means secured to one of said arms and cooperating with said upstanding portion to raise or lower one end of the central member relative to the other end whereby the plows are leveled.

8. A tractor comprising the combination of a tractor having a frame and a draft member, a plurality of plow beams with plows and connected to the draft member, a bail mounted on the tractor and comprising a pair of arms respectively pivoted to opposite sides of the frame, each of said arms being provided with a fitting loosely mounted thereon, a central member rotatably carried by said fittings, said beams being secured to said central member, said central member having a rigid upstanding portion, and means secured to one of said arms and cooperating with said upstanding portion to raise or lower one end of the central member relative to the other end whereby the plows are leveled.

9. A tractor plow comprising the combination of a tractor having a frame, a draft member, and a power lift device, a plurality of plow beams having plows thereon, means connecting said beams to said draft member including a spring cushioned hitch device, a bail mounted on the tractor and actuated by said power lift device to swing vertically and lift the plows, said bail comprising a pair of arms respectively pivoted to opposite sides of the frame, each of said arms being provided with a fitting loosely mounted thereon, and a central member rotatably carried by said fittings, said beams being secured to said central member, anti-friction means carried by said central member, each of said plow beams having a bracket embracing said anti-friction means whereby the plow beams move with the central member, said central member having a rigid upstanding portion, and means secured to one of said arms and cooperating with said upstanding portion to raise or lower one end of the central member relative to the other end whereby the plows are leveled.

10. A tractor comprising the combination of a tractor having a frame and a draft member, a plurality of soil tilling tools connected with the draft member, a bail mounted on the tractor and comprising a pair of arms respectively pivoted to the opposite sides of the frame and movably carrying a central member, said tools being connected with said central member, and means operating between one of the arms and the central member to raise or lower one end of the central member relative to the other end whereby the plows are leveled.

11. A tractor plow comprising the combination of a tractor having a frame and a draft member, a plurality of plow beams having plows thereon and connected with the draft member to swing vertically, a bail journaled on the tractor and having a slotted connection with the plow beams for raising and lowering the latter, means for swinging the bail, and means for raising one part of the bail relative to the other.

12. An agricultural implement comprising a wheeled frame, a plurality of tool beams pivotally connected to the frame, a U-shaped bail having the arms thereof pivotally connected with said frame and the intermediate portion slidably connected with said beams, means for swinging the bail, and means for leveling the intermediate portion.

In witness whereof, I have hereunto subscribed my name this 10th day of October, 1929.

THEOPHILUS BROWN.